United States Patent [19]

Baum

[11] Patent Number: 4,918,604
[45] Date of Patent: Apr. 17, 1990

[54] PRESCRIPTION DRUG DEPICTION AND LABELING SYSTEM

[75] Inventor: Mark S. Baum, Brooklyn, N.Y.

[73] Assignee: Medco Containment Services, Inc., Elmwood Park, N.J.

[21] Appl. No.: 258,183

[22] Filed: Oct. 3, 1988

[51] Int. Cl.$^4$ .............................................. G06F 15/42
[52] U.S. Cl. ................................ 364/413.01; 364/479; 364/200
[58] Field of Search .............. 364/413.01, 478, 479, 364/222.6, 222.8; 221/5, 9; 283/900

[56] References Cited

U.S. PATENT DOCUMENTS

| | | | |
|---|---|---|---|
| 4,695,954 | 9/1987 | Rose et al. | 364/413.01 |
| 4,732,411 | 3/1988 | Siegel | 364/413.01 |
| 4,733,362 | 3/1988 | Haraguchi | 364/479 |
| 4,817,023 | 3/1989 | Yamaguichi et al. | 364/478 |

Primary Examiner—Jerry Smith
Assistant Examiner—Gail O. Hayes
Attorney, Agent, or Firm—Lane & Aitken

[57] ABSTRACT

In a drug labeling and prescription filing system, a multiplicity of files of data are maintained, each file of data representing in color a graphic illustration of a different prescription drug. When a prescription drug is filled, the corresponding file of data is automatically selected and used to control a color printer to print a graphic illustration of the drug of the prescription on the label applied to the container and containing the prescription data.

10 Claims, 1 Drawing Sheet

PRESCRIPTION DRUG DEPICTION AND LABELING SYSTEM

This invention relates to a system for labeling the containers of prescription drugs in pill form at the time the drugs are dispensed and more particularly to a system which automatically provides an illustration of the pill or capsule of the prescription on the label to educate the consumer or patient.

Prescription drugs in pill or capsule form come in various shapes and colors, and this variation serves to distinguish the different drugs from one another and helps educate the consumer and increases visual familiarity with prescription drugs.

SUMMARY OF THE INVENTION

In accordance with the present invention, when the label for the prescription container, containing the patient's name, the prescribing physician's name and the directions for taking the drug is printed, a computer program routine digitally representing a depiction of the pill or capsule in color is called from a file of routines for all of the different shapes and colors of pills and capsules and this routine is applied to the printer which prints the prescription label and causes the printer to print a picture in color of the pill or capsule on the label. In this manner, each prescription drug is automatically provided with a label illustrating the pill or capsule in full color so that both the pharmacist who is filling the prescription and the patient can compare the picture of the drug on the label with the drugs in the container and the patient is better educated on and made familiar with the visual appearance of the drug.

DESCRIPTION OF THE PREFERRED EMBODIMENT

In the specific embodiment of the invention described herein, the system is designed for use in dispensing prescription drugs by mail service wherein the patient mails in the physician's prescription to the mail service pharmacy which then prepares the prescription and mails it back to the patient. However, it will be appreciated that the system of the present invention is readily adapted for dispensing of prescription drugs by retail pharmacies.

Figure 1:
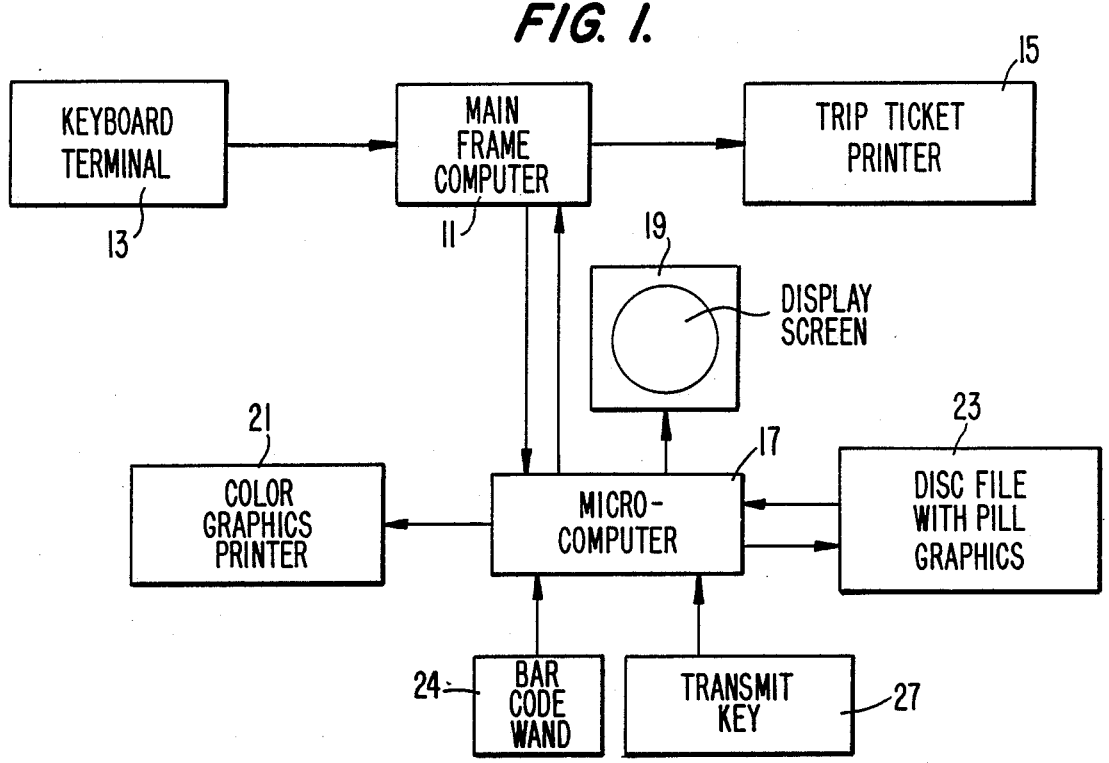
FIG. 1 is a block diagram illustrating the system of the invention.
Figure 2:
FIG. 2 illustrates an example of a computer printed document used in the system of the invention.

As shown in FIG. 1, the system of the present invention contains a main frame computer 11 controlled by a keyboard terminal 13. When a prescription is received by the mail service pharmacy employing the system, a pharmacist will edit the received prescription including adding a number identifying the drug of the prescription and then the data from the edited prescription including the drug number will be entered in the main frame computer 11 by means of the terminal 13. In the system of the invention, each different drug which can be filled by the mail service pharmacy will be assigned a unique number identifying the drug. The main frame computer 11 contains a program to organize each received prescription into prescription data packets and to assign a unique prescription number to the prescription. This prescription number is stored in the prescription data packet and constitutes the means for finding the data packet in the memory of the computer 11. A patient typically will send in more than one prescription in a mailing and each prescription received is assigned a unique prescription number, which is entered into the memory of the main frame computer. Immediately after each prescription in the mailing has been entered into the main frame computer as a prescription data packet, a printer at the main frame computer prints out a "trip ticket", an example of which is shown in FIG. 2. The main frame computer prints on the trip ticket a bar code representing the prescription number for each prescription in the mailing received from a patient. In FIG. 2, the trip ticket contains two prescriptions and thus two bar codes 41 are shown on the trip ticket. In addition, the printer of the main frame computer prints in alphanumeric characters information about the prescription including the prescription numbers, the drug name, the patient's name, and the time and day that the trip ticket was printed. The trip ticket is attached to the edited prescription and then forwarded to the dispensing pharmacist. The dispensing pharmacist operates a microcomputer 17 which is in communication with the main frame computer 11 and also controls a cathode ray display unit 19, a color printer 21 capable of printing color graphics and a disk file 23. The dispensing pharmacist, after receiving the prescription with the trip ticket, reads the bar codes on the trip ticket with a wand 24 or bar code reader, which optically reads the bar code and sends the signals to the microcomputer representing the prescription number represented by the bar code. When a bar code signal is received by the microcomputer 17 from the wand 24, the microcomputer 17 sends a request to the main frame computer 11 for the prescription data packet identified by the prescription number represented by the bar code signal. In response to receiving this request from the microcomputer 17, the main frame computer 11 finds the prescription data packet in its memory identified by the prescription number included in the request and sends the data packet to the microcomputer 17. The microcomputer 17 then displays the information in the data packet on the display unit 19. The dispensing pharmacist can then compare the prescription information in the data packet as displayed by the display unit 19 with the information on the prescription and confirm that the prescription as displayed conforms with the received prescription. Upon confirming that the display data conforms with that on the prescription itself, the dispensing pharmacist then actuates a transmit key 27 which causes a printer 19 to print prescription labels.

Figure 3:
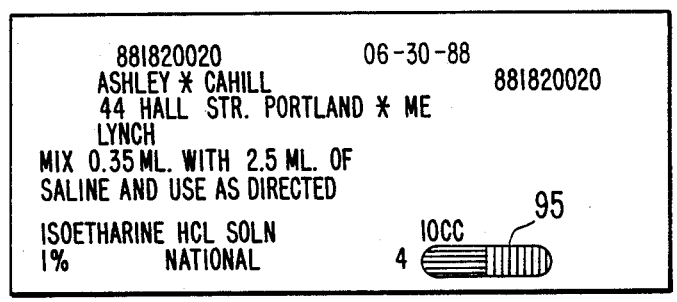
FIG. 3 illustrates an example of a prescription label printed by the system of the invention.

The disk file 23 contains a file of program routines each of which when applied to the color printer 21 will cause the color printer to print a depiction of a specific pill or capsule. Each of the routines in the disk file 23 is identified in the disk file 23 by the unique drug number which identifies the drug of the depicted pill or capsule. When the dispensing pharmacist actuates the transmit key, the microcomputer sends the drug number of the prescription data packet currently in the memory of the microcomputer 17 to the disk file 23 to find the routine corresponding to this drug number and read out the routine into the memory of the microcomputer 17, where the routine is assembled with the prescription data packet. The microcomputer 17 then operates the color printer 21, making use of the assembled prescription data packet and the graphics routine representing the pill or capsule of the prescription in color, to print the prescription label with a color illustration of the drug corresponding to the prescription. An example of a prescription label printed by the system of the present invention is shown in FIG. 3. As shown in this figure, the prescription label contains the prescription number 881820020, the date the prescription was filled, 6-30-88, the patient's name, Ashley Cahill, followed by the patient's address, the prescribing physician's surname, the directions for using the prescription, the name of the drug, Isoetharine HCL Soln, and the name of the manufacturer. A color illustration 95 of the drug capsule Isoetharine HCL Soln is illustrated in the lower right-hand corner. This label is applied to the container delivered to the patient and containing the drug capsules, which will have the same appearance and color as the illustration 95 on the label.

At the same time the printer 19 prints the prescription container label, it will also print a mailing label to go on the package to mail the prescription to the patient as well as a refill label to be sent in the package to the user and to be used by the patient to obtain a refill of the prescription. In addition, other documents are printed for internal record keeping at the same time by the printer 19. To complete the prescription filling procedure, the pills or capsules of prescription are dispensed into the prescription container; the container label like that shown in FIG. 3 is applied to the container; the labeled and filled container is enclosed in a mailing package with the refill label the mailing label is applied to the mailing package; and the mailing package is mailed to the patient.

Also, the microcomputer 17 transmits back to the main frame computer 11 a message to the main frame 11 that the particular prescription has been filled, which indication is stored in the corresponding prescription data packet in the main frame computer.

The program routines for depicting pictures of each different pill or drug capsule can either be provided by using computer graphics to paint a picture of each different pill or capsule to be prescribed by the system or, alternatively, a video camera can be employed to take a video picture of each pill or capsule which is digitized as a routine to generate the pill or capsule illustration when applied to the printer 19.

The above-described system is of a preferred embodiment of the invention and modification thereof may be made without departing from the spirit and scope of the invention, which is defined in the appended claims.

What is claimed is:

1. A system for preparing a label for prescription drugs comprising data storage means storing a multiplicity of files of data, each file of data representing a color illustration of a different pill or capsule of a prescription drug, computer means to select one of said files of data and to print in color a graphic illustration of the pill or capsule represented by such file of data on a prescription drug label.

2. A system as recited in claim 1, wherein said means to select one of said files of data assembles such file of data with prescription data to be printed on said prescription drug label and prints said prescription data in alphanumeric characters on said prescription drug label along with the graphic illustration of the pill or capsule.

3. A system as recited in claim 1, further comprising means to transmit prescription data packets to said computer means, each prescription data packet corresponding to a prescription to be filled and including an identification of the drug of the prescription to be filled, said computer means selecting the data file in said data storage means in response to the drug identification in the received data packet.

4. A system as recited in claim 3, wherein said means to transmit data packets to said computer means comprises additional storage means for storing a plurality of prescription data packets to be filled.

5. A system as recited in claim 4, wherein said computer means includes means to select one of said prescription data packets in said additional storage means and cause said additional storage means to transmit the selected prescription data packet to said computer means.

6. A system as recited in claim 5, wherein said computer means includes means to receive data comprising prescription identifiers, each identifier representing one of said prescription data packets and to transmit each received identifier to said additional storage means to select the corresponding prescription data packet in said additional data storage means.

7. A method of labeling prescription drugs comprising maintaining a multiplicity of files of digital data in a random access data storage means, each data file representing a color graphic illustration of a different pill or capsule of a prescription drug, selecting the file of said data corresponding to the drug of a prescription being filled, printing the graphic illustration of the pill or capsule represented by the selected file or data in color on a label and applying said label to the container of a prescription being filled.

8. A method as recited in claim 7, further comprising printing prescription data in alphanumeric characters on said label.

9. A method as recited in claim 8, wherein said prescription data and alphanumeric characters is printed on said label at the time said graphic illustration is printed on said label.

10. A method of filling drug prescriptions comprising maintaining a multiplicity of data files in data storage means, each data file representing a graphic illustration of a different prescription drug to be filed, preparing a prescription data packet corresponding to each prescription to be filled including an identification of the drug of said prescription, dispensing the drug identified by said prescription data packet into a container, selecting from said multiplicity of files the file of data representing the drug identified by the drug identification in said prescription data packet, and printing in color a graphic illustration of the drug represented by the selected data file on a label, and applying said label to said container.

* * * * *